(No Model.)
C. & E. J. DALTON.
SKATE ROLLER.
No. 328,111. Patented Oct. 13, 1885.
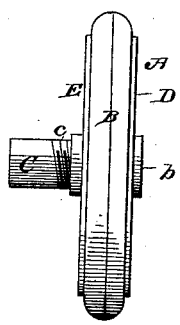
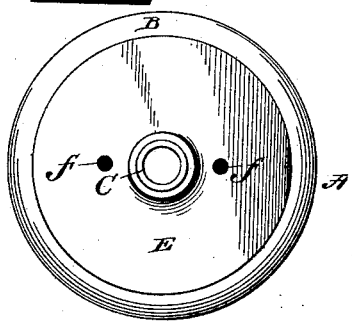
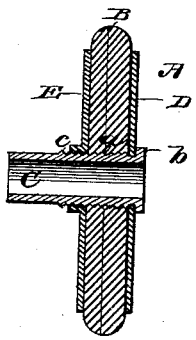
WITNESSES
C. W. Dashiell
Edward G. Siggers
INVENTORS
Charles Dalton and
Edward J. Dalton.
By C. A. Snow & Co.
Attorneys

UNITED STATES PATENT OFFICE.

CHARLES DALTON AND EDWARD JAMES DALTON, OF OSHKOSH, WIS.

SKATE-ROLLER.

SPECIFICATION forming part of Letters Patent No. 328,111, dated October 13, 1885.

Application filed May 5, 1885. Serial No. 164,472. (No model.)

*To all whom it may concern:*

Be it known that we, CHARLES DALTON and E. JAMES DALTON, citizens of the United States, residing at Oshkosh, in the county of Winnebago and State of Wisconsin, have invented a new and useful Improvement in Skate-Rollers, of which the following is a specification, reference being had to the accompanying drawings.

Our invention relates to wheels for roller-skates; and it has for its object to provide a wheel of this character, whereby friction will be lessened, thereby making a higher rate of speed attainable; to provide a wheel which will not slip upon the floor, and, further, to provide a roller-skate wheel whereby, when the wearing-surface becomes worn so as to be unfitted for use, it may be replaced at a slight cost.

With these ends in view the invention consists in the improved construction and combinations of parts hereinafter fully described, and pointed out in the claims.

In the drawings, Figure 1 is a front elevation of our improved wheel. Fig. 2 is a side elevation of the same, and Fig. 3 is a transverse vertical section.

In the accompanying drawings, in which like letters of reference indicate corresponding parts in all the figures, A represents a wheel for roller-skates constructed in accordance with our invention. The said wheel consists of a central bearing or wearing-disk, B, which is preferably of two or more layers of the best quality of sole-leather cut to the proper size, cemented together under a very heavy pressure, the peripheral edge of said disk being rounded, as shown in Fig. 1. The disk B is provided with a centrally-located hole or opening, *a*, through which passes a tube or bushing, C. The tube or bushing C is formed at its outer end with an annular rim or flange, *b*, and on said bushing, between the said rim or flange *b* of the tube or bushing C and the outer side of the disk B, is a metal plate, D, which is somewhat smaller than the disk B, thus leaving its wearing-edge exposed. The tube or bushing C is provided with exterior screw-threads, *c*, which engage the threads in the opening *a* of the disk B.

The inner end of the tube or bushing extends a considerable distance beyond the inner side of the disk B, and on said inner end is a plate, E, having a centrally-located opening, surrounding which is an annular flange, which is of the same internal diameter as the opening in the plate E, said opening and the flange being provided with interior screw-threads to engage the threads on the tube or bushing C. The said plate E may be provided with holes or openings *f*, by which it may be tightened on the tube or bushing, and after said plate is tightened it may be held in place by driving tacks through said opening.

It will be observed that should the leather disk B become worn, so as to be unfitted for use, it may be readily removed and substituted by another without the expense of procuring a new wheel.

It will also be observed that a metallic bushing is provided for the axle.

A wheel constructed as before described is simple in its construction, may be manufactured and supplied at a slight cost, it thoroughly obviates all slipping, and reduces friction to the minimum.

In order to define the nature and scope of the present invention, we would say that heretofore it has been proposed to provide an elastic resilient roller with plates on the side faces thereof and adapted to clamp them in position by means of a disk carrying an axle, and having its opposite ends threaded for the reception of another clamping-disk adapted to bear against the opposite plate. Our invention differs from this in the fact that we employ an exteriorly-threaded axle bush or sleeve having a collar at one end to clamp one of the plates, and having its threaded portion engaging the wear-disk, and a threaded sleeve of the opposite wear-plate. This construction provides a wheel which possesses the necessary requisites of strength, lightness, and durability, while at the same time it is very simple in construction and cheap of manufacture.

Having fully described our invention, what we claim as new, and desire to secure by Letters Patent, is—

1. In a wheel for roller-skates, the combination of a wear-disk, plates located on opposite sides of said disk, and an exteriorly-threaded bushing having an annular flange or ring at one end adapted to engage one of the plates, and having its threaded portion engaging the wear-disk and opposite plate, as set forth.

2. In a roller-skate, the combination of the wear-disk comprising two disks of leather cemented together and having a turned or rounded bearing-edge and a threaded bearing, a clamp-plate, D, fitted against one face of the disk, a metallic bushing, C, having a flange or rim at one end adapted to clamp the plate D, and an exteriorly-threaded portion engaging the disk-aperture, and a clamp-plate, E, having a threaded collar adapted to engage the threaded bushing, all arranged and adapted to serve as set forth.

In testimony that we claim the foregoing as our own we have hereto affixed our signatures in presence of two witnesses.

CHARLES DALTON.
EDWARD JAMES DALTON.

Witnesses:
ISAAC E. HOLLENBECK,
RUFUS S. POWERS.